(12) United States Patent
Sun

(10) Patent No.: US 6,898,008 B1
(45) Date of Patent: May 24, 2005

(54) FRONT PROJECTION SCREEN

(76) Inventor: Bolin Sun, No. 256, Fukang Road, Xinpu District, Lianyungang City, Jiangsu Province 222004 (CN)

( * ) Notice: Subject to any disclaimer, the term of this patent is extended or adjusted under 35 U.S.C. 154(b) by 0 days.

(21) Appl. No.: 10/415,444

(22) PCT Filed: Oct. 31, 2000

(86) PCT No.: PCT/CN00/00411

§ 371 (c)(1),
(2), (4) Date: Nov. 21, 2003

(87) PCT Pub. No.: WO01/33298

PCT Pub. Date: May 10, 2001

(30) Foreign Application Priority Data

Nov. 1, 1999 (CN) .......................................... 99121053 A

(51) Int. Cl.[7] ............................................. G03B 21/56
(52) U.S. Cl. ...................................... 359/443; 359/449
(58) Field of Search ................................ 359/443, 449, 359/459

(56) References Cited

U.S. PATENT DOCUMENTS

| | | | | |
|---|---|---|---|---|
| 1,759,777 A | * | 5/1930 | Cawley | ....................... 359/459 |
| 4,670,095 A | | 6/1987 | Negishi | |
| 4,911,529 A | * | 3/1990 | Van De Ven | ............... 359/459 |
| 4,964,695 A | | 10/1990 | Bradley, Jr. | |
| 5,337,179 A | * | 8/1994 | Hodges | ....................... 359/443 |
| 6,023,369 A | * | 2/2000 | Goto | ........................... 359/449 |
| 6,530,664 B2 | * | 3/2003 | Vanderwerf et al. | ......... 359/459 |
| 6,574,041 B1 | * | 6/2003 | Chen | ........................... 359/459 |
| 2003/0039030 A1 | * | 2/2003 | Myers | ......................... 359/449 |

FOREIGN PATENT DOCUMENTS

| | | |
|---|---|---|
| EP | 0421809 | 4/1991 |
| EP | 0551127 | 7/1993 |
| EP | 0825460 | 2/1998 |
| EP | 0825480 | 2/1998 |
| JP | 53058235 | 5/1978 |
| JP | 2262134 | 10/1990 |
| JP | 3194532 | 8/1991 |
| JP | 5011345 | 1/1993 |
| JP | 06266280 | 9/1994 |
| JP | 9218465 | 8/1997 |

* cited by examiner

Primary Examiner—Christopher Mahoney
(74) Attorney, Agent, or Firm—D. Peter Hochberg; Sean Mellino; Katherine R. Vieyra

(57) ABSTRACT

A front projection screen includes a plane base layer forming a plurality of parallel outwardly-protruding annular bars on the light-reflecting side surface thereof. Each bar contains an outside surface facing the projection light source and being a light-reflecting portion, and an outside surface not facing the projection light source and being a stray-light absorbing portion. The two surfaces intersect each other. All bottom interfaces between the bars and the base layer are in a common plane. All outside surfaces of these bars have a common focus point. The outside surface is arranged in such a manner that the outside surface of each bar does not block the projection light incident on the whole outside surface of its adjacent bar.

17 Claims, 3 Drawing Sheets

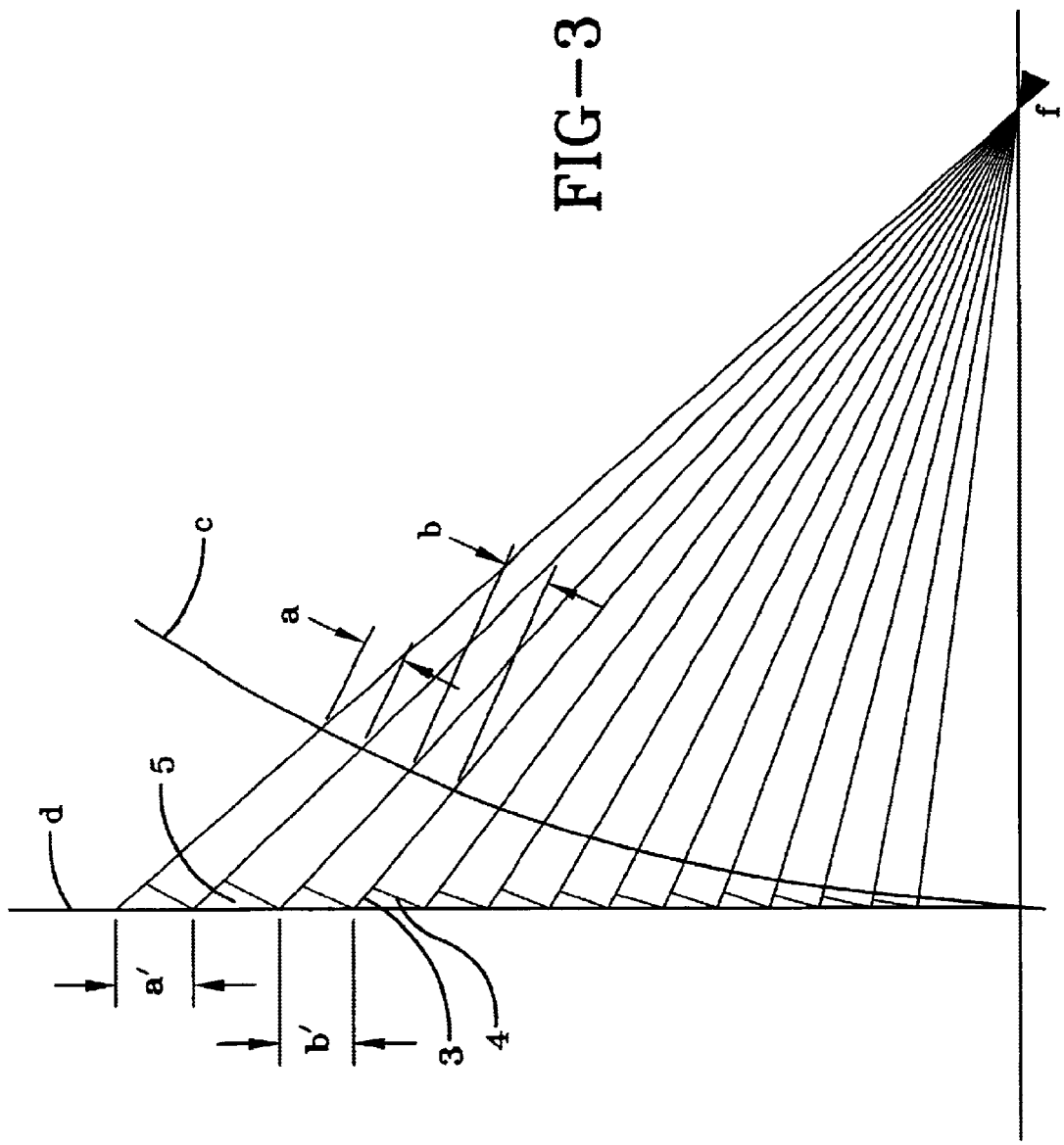

FRONT PROJECTION SCREEN

CROSS REFERENCE TO RELATED APPLICATIONS

This application is the U.S. National Stage application of international application number PCT/CN00/00411 filed on Oct. 31, 2000.

TECHNICAL FIELD

The present invention relates to a front projection screen, more particularly, to a flat front projection screen.

BACKGROUND

Current front projection screens typically adopt a curved surface, such as a parabolic hard screen. Although they demonstrate an excellent optical performance, higher level of gain, and less amount of light loss, this kind of front projection screens must demand relatively high rigid materials for manufacturing due to its non-flat screen, so they cannot be wrapped up and it is difficult to set up and carry around. In addition, there are no black strips on the screen so that it has to counteract the effect of ambient light by increasing gain. Nowadays, among the existing front projection screens, there are also some flat hard screens, but they are formed by reflection unit (spot) matrix array of a small-sized concave surface, or by straight-line strip array with certain angles. As a result, the optical performance of current flat hard screens is substantially inferior to that of non-flat screens, such as a parabolic hard screen. Furthermore, no black strips are formed on current flat hard screens to absorb the ambient incident light, which results in their lower capability to defend the ambient light.

DESCRIPTION

The objective of the present invention is to provide a flat front projection screen, which not only has the advantages of non-flat screens such as a parabolic type, but also forms black-light-absorbing strips without blocking the projection light, so as to significantly enhance the contrast of the image and enable viewers to achieve a higher contrast plane picture under a brightened environment.

The objective is realized by a front projection screen with the following features: the front projection screen comprises a flat screen base layer wherein a plurality of ring-shaped segments are configured in parallel on the surface of the light-reflecting portion and protrude towards the outer side. The ring-shaped segment has two external facets, one of which faces the projection light source. They intersect each other to form a light-reflecting portion (first side) at the external facet that faces the projection light source while making an ambient light-absorbing portion (second side) at the area where it does not face the projection light source. Each ring-shaped segment is on the common plane with the bottom boundary of the screen base layer. The relation of position of each ring-shaped segment's external facet, facing the projection light source in relation to the screen base layer and all ring-shaped segments on the common plane is determined by the following manner: every facet facing the projection light source in all ring-shaped segments has a common focus point to reflect the projection light in parallel. Meanwhile, the relation of position of the external facet which does not face the projection light source in relation to the screen base layer and all ring-shaped segments on the common plane is yet determined by the following way: Every facet facing the projection light source in each ring-shaped segment does not block the projection light directed towards the whole facet area that faces the light source in adjacent ring-shaped segments so as to generate combined black strips without causing luminous flux loss in between while at the same time absorb ambient incident light.

The front projection screen can form combined black strips at the side of the screen of light-reflecting portion, which helps to achieve improvement in the picture contrast and darkness of the screen without blocking the projection light. It can absorb ambient light to diminish its effect without causing luminous flux loss. Accordingly, when viewed in a brightened surrounding, it develops a notably high degree of gain. It can be understood that all the ring-shaped segments on the screen are formed by breaking parabolic surface into minute ring-shaped concave lenses and then scatter them over the screen base layer in accordance with certain rules, (That is, to reflect the light from the focus point in parallel, each reflective concave surface of ring-shaped segments possess a common or an approximately common focus point) so that the front projection screen, which appears flat, have the features and functions of a parabolic type of screen. That is also to say, the front projection screen forms a light-absorbing portion to prevent it from being disturbed or influenced by the ambient light while having optical features of a parabolic screen. Consequently, since this screen is not a flat one, it can be processed into a soft screen, making it easy to set up, wrap up and carry around.

The objective of the present invention can also be realized by another manner: the front projection screen comprises a flat screen base wherein a plurality of ring-shaped segments are configured in parallel on the surface of the light-reflecting portion and protrude towards the outer side. The ring-shaped segment has two external facets, one of which faces the projection light source. They intersect each other to form a light-reflecting portion at the external facet that faces the projection light source while making an ambient light-absorbing portion at the area where it does not face the projection light source. Each ring-shaped segment is on the common plane with the bottom boundary of the screen base layer. The relation of position of each ring-shaped segment's external facet, facing the projection light source in relation to the screen base layer and all ring-shaped segments on the common plane is determined by the following manner: every facet facing the projection light source has a common curvature center but with different curvature radius. At the same time, the relation of position of the external facet that does not face the projection light source in relation to the screen base layer and all ring-shaped segments on the common plane is yet determined by the following way: every facet facing the projection light source in each ring-shaped segment does not block the projection light directed towards the whole facet area which faces the light source in adjacent ring-shaped segments so that it generates combined black strips without bringing about luminous flux loss in between.

The front projection screen can form combined black strips at the side of the screen of light-reflecting portion, which helps to achieve improvement in the picture contrast and darkness of the screen without blocking the projection light. It can absorb ambient light to diminish its effect without causing luminous flux loss. Accordingly, when viewed in a brightened surrounding, it develops a notably high degree of gain. It can be understood that all the ring-shaped segments on the screen are formed by breaking spherical surface into minute ring-shaped concave lenses and then scatter them over the screen base in accordance with certain rules so that the front projection screen, which appears flat, has the features and functions of a spherical type of screen. That is also to say, the said front projection screen forms a light-absorbing portion to prevent it from being disturbed or influenced by the ambient light while having optical features of a spherical surface. Consequently, since this screen is not a flat one, it can be processed into a soft screen, making it easy to set up, wrap up and carry around.

In the above-mentioned two types of front projection screens, the light-reflecting portion formed at the external facet, which faces the projection light source, is called light-diffusing reflection portion.

In the above-mentioned two types of front projection screens, the light-reflecting portion formed at the external facet, which faces the projection light sources, is called light-full reflection portion.

Combined with the optical system of the projector, the said front projection screen can produce amplified virtual images, e.g. demonstrate a holographic effect on the projector.

In the above-mentioned two types of front projection screens, the surface is a hard screen.

In the above-mentioned two types of front projection screens, the surface is a soft screen.

With respect to the said front projection screen, owing to the flexibility of the soft screen, it is easy to set up, wrap up and carry around.

In the above-mentioned two types of front projection screens, each adjacent strip, which faces the external facet of the projection light source, is a curved surface with an approximately similar size and shape or a curved surface, which occupies an approximately equivalent vertical projection area on the screen base.

BRIEF ILLUSTRATION OF DRAWINGS

FIG. 3 is an optical principle chart of the preferred embodiment shown in FIG. 1.

PREFERRED EMBODIMENTS

Figure 1:
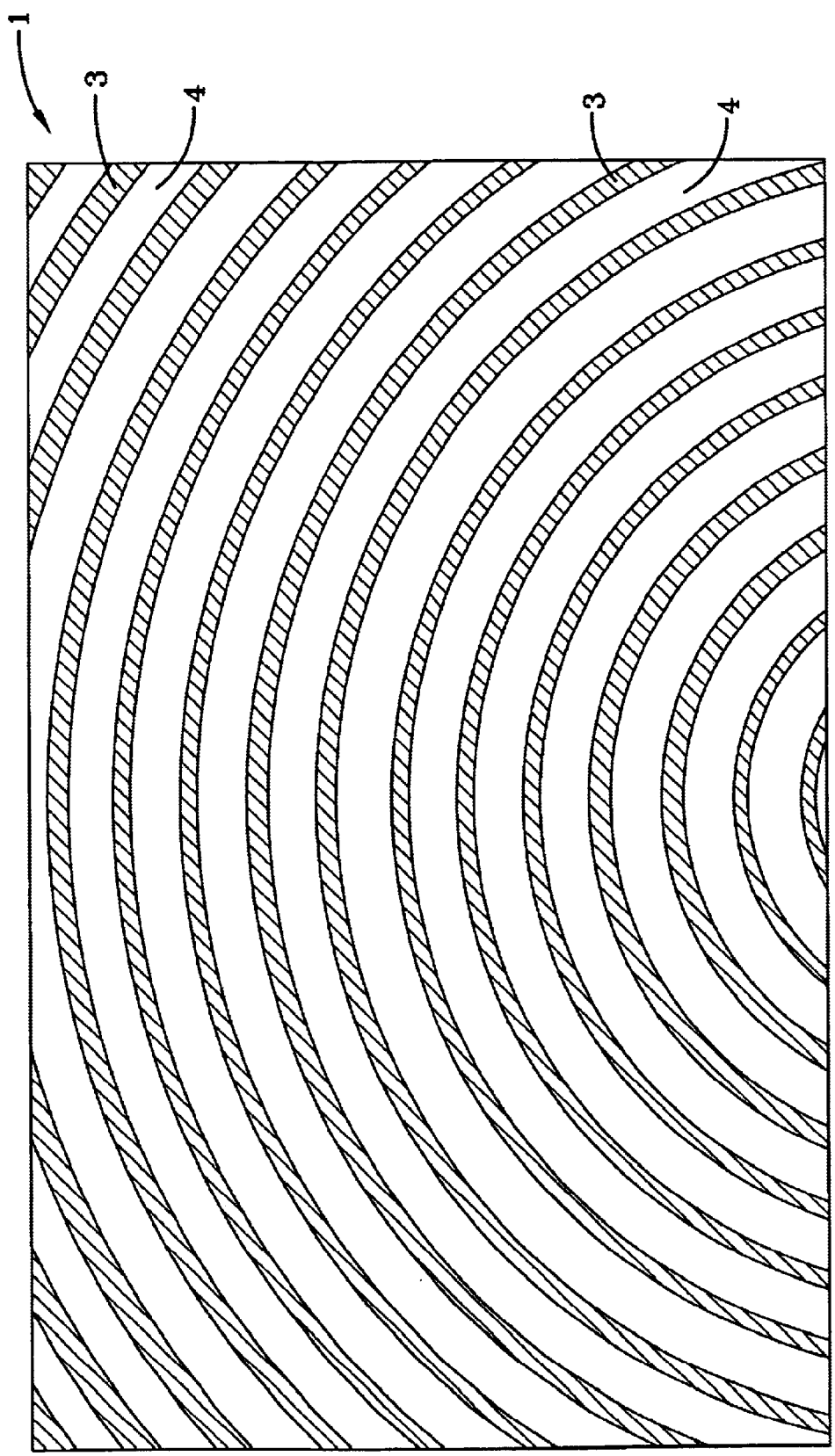
FIG. 1 is a front view of the front projection screen of the present invention.
Figure 2:
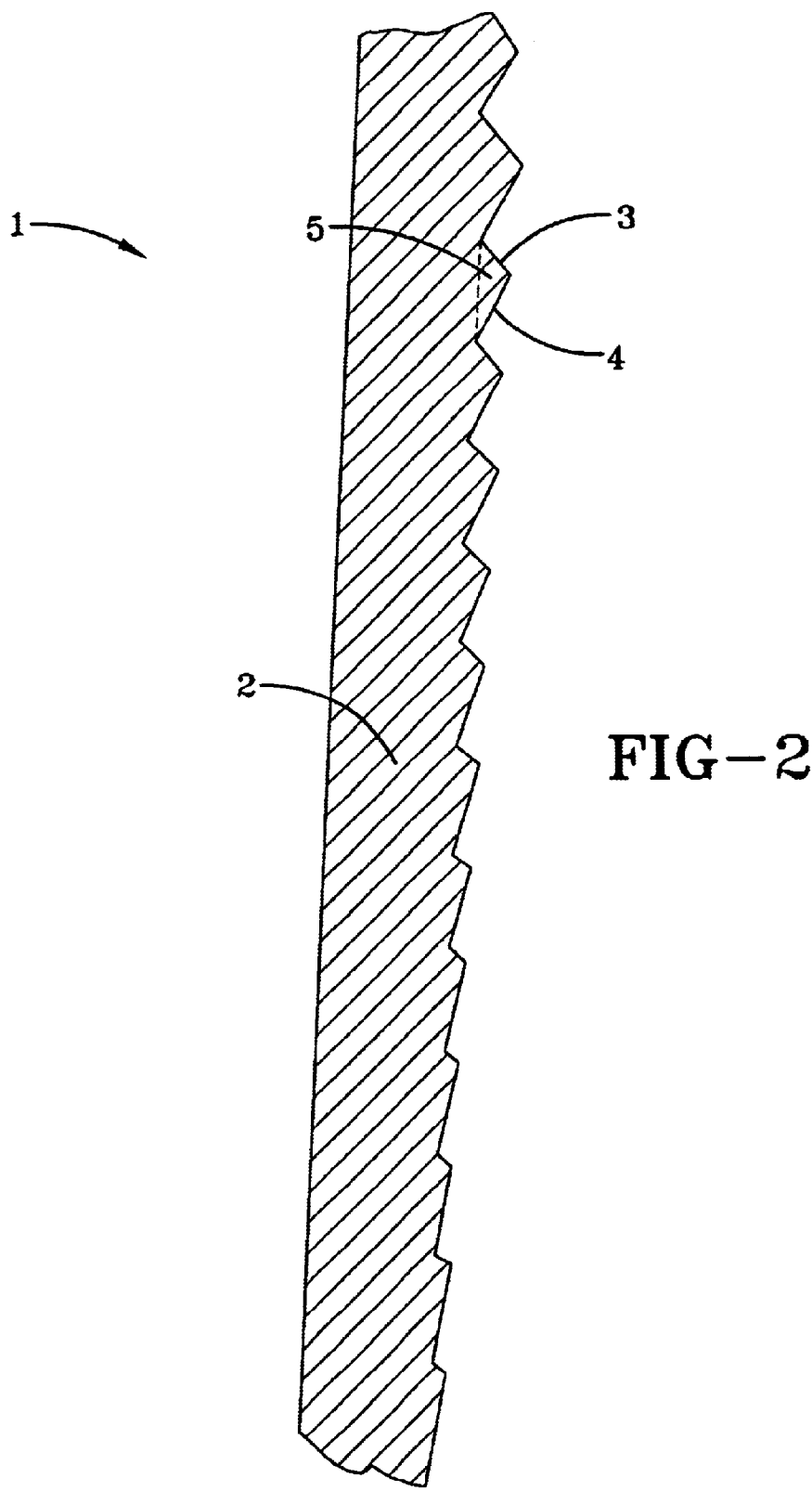
FIG. 2 is a cross section view of the preferred embodiment shown in FIG. 1.

As shown in FIG. 1 and FIG. 2, the front projection screen 1 consists of the flat screen base layer 2 wherein there are a plurality of ring-shaped segments 5 configured closely in parallel, they protrude towards the light-reflecting side, each ring-shaped segment 5 includes the curved surface 4 that faces the projection light source and surface 3 that does not face the projection light source. The bottom area of these ring-shaped segment 5 (as underlined by dash line in FIG. 2) are on the common plane, forming a light-reflecting portion on the curved surface 4 where it faces the projection light source and an ambient light-absorbing portion on the surface 3 where it does not face the projection light source. With respect to the front projection screen 1, it appears flat when viewed as a whole but actually it is not a flat screen, associated with a plurality of minute ring-shaped reflective concave lenses.

As shown in FIG. 3, the concave surface 4 in a plurality of the said ring-shaped segment 5 is formed and defined as following: breaking certain paraboloid c into a number of ring-shaped bars respectively, and employ them on a plane d in parallel so as to make the corresponding focus points of the concave surface 4 of all ring-shaped bars 5 concentrate on point f, namely, concave surface 4 reflects in parallel the projection light coming from the focus point f and constitute the light-absorbing portion 3 by the following manner: the said surface 3 does not block the projection light coming from the focal point f, which is directed to the adjacent, e.g. the concave surface 4 of a ring-shaped segment 5. However, it is necessary to point out here that to screen 1, the said paraboloid c is a paraboloid that has a biased focus point. Consequently, as screen 1 is concerned, each concave surface 4 of the minute paraboloid has a biased focus point. Moreover, each concave surface 4 can be arranged in vertical direction with equal arc length, such as a equals b or can be done in accordance with the same height of the vertical projection on the plane d, such as a' equals b'.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

What is claimed is:

1. A front projection screen comprising:
    a flat screen base layer having a first sides, a second side and a bottom boundary;
    a plurality of concavely curved light-reflecting segments on the first side of said base layer for reflecting the light emitted from a light projection source, wherein each light-reflecting segment of said plurality of light-reflecting segments has a common curvature center but a different radius of curvature; and
    a plurality of light-absorbing segments for absorbing ambient light located on said first side of said base layer.

2. The front projection screen according to claim 1, wherein said plurality of light-reflecting segments and said plurality of light-absorbing segments are formed by a plurality of ring-shaped bars on said first side of said base layer, said plurality of ring-shaped bars protruding from said first side.

3. The front projection screen according to claim 2, wherein each ring-shaped bar is on a common plane with the bottom boundary of the screen base layer.

4. The front projection screen according to claim 1, wherein each light-reflecting segment of said plurality of light-reflecting segments has a common focus.

5. The front projection screen according to claim 1, wherein said plurality of light-absorbing segments do not block the light from said light projection source.

6. The front projection screen according to claim 5, wherein said light-absorbing segments are black.

7. The front projection screen according to claim 1, wherein said light-reflecting segments and said light-absorbing segments are formed in an alternating manner on said first side of said base layer.

8. The front projection screen according to claim 1, wherein said light-reflecting segments diffuse light.

9. The front projection screen according to claim 1, wherein said light-reflecting segments fully reflect light.

10. The front projection screen according to claim 1 wherein said screen is a hard screen.

11. The front projection screen according to claim 1 wherein said screen is a soft screen.

12. The front projection screen according to claim 1, wherein said light-reflecting segments are curved in shape.

13. The front-projection screen according to claim 1, wherein each light-reflecting segment is a curved surface with an approximately similar size and shape or a curved surface, which occupies an approximately equivalent vertical projection area on the screen base.

14. The front projection screen according to claim 1 wherein at least one light-reflecting segment of said plurality of light-reflecting segments includes a bottom boundary, wherein each of said bottom boundary is in a common plane.

15. The front projection screen according to claim 1 wherein each light-reflecting segment of said plurality of light-reflecting segments has a substantially equal arch length.

16. The front projection screen according to claim 1 wherein each light-reflecting segment has a height of projection onto said base layer and wherein each of said height of projection is substantially equal.

17. The front projection screen according to claim 1 wherein said light-absorbing segments are arranged to follow a respective line of projection from said common focus or curvature center onto said base layer.

* * * * *